United States Patent
Iwamura et al.

(10) Patent No.: US 7,164,682 B2
(45) Date of Patent: Jan. 16, 2007

(54) ATM COMMUNICATION APPARATUS AND BANDWIDTH CONTROL METHOD OF THE SAME

(75) Inventors: Atsushi Iwamura, Yokohama (JP); Noriko Saitoh, Yokohama (JP); Hiroshi Hashimoto, Yokohama (JP); Yoshihiro Ashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 648 days.

(21) Appl. No.: 09/774,715

(22) Filed: Feb. 1, 2001

(65) Prior Publication Data

US 2001/0028631 A1    Oct. 11, 2001

(30) Foreign Application Priority Data

Feb. 1, 2000  (JP) .............................. 2000-023513
Jan. 26, 2001 (JP) .............................. 2001-017942

(51) Int. Cl.
*H04L 12/56* (2006.01)

(52) U.S. Cl. ............................. 370/395.21; 370/230.1; 370/468

(58) Field of Classification Search ................ 370/230, 370/232, 233, 395.2, 395.21, 468, 230.1
See application file for complete search history.

(56) References Cited

U.S. PATENT DOCUMENTS

| | | | | |
|---|---|---|---|---|
| 4,009,346 A | | 2/1977 | Parker et al. ............... | 370/341 |
| 4,748,617 A | | 5/1988 | Drewlo ....................... | 370/446 |
| 5,142,532 A | | 8/1992 | Adams ........................ | 370/449 |
| 5,258,979 A | * | 11/1993 | Oomuro et al. ............ | 370/232 |
| 5,357,510 A | * | 10/1994 | Norizuki et al. ........... | 370/236.2 |
| 5,784,358 A | * | 7/1998 | Smith et al. ................ | 370/230 |
| 5,926,478 A | | 7/1999 | Ghaibeh et al. ............ | 370/449 |
| 5,953,338 A | * | 9/1999 | Ma et al. ................. | 370/395.21 |
| 6,188,697 B1 | * | 2/2001 | Umehira et al. ............ | 370/412 |
| 6,317,234 B1 | | 11/2001 | Quayle ....................... | 340/3.51 |
| 6,469,991 B1 | * | 10/2002 | Chuah ......................... | 370/329 |
| 6,628,668 B1 | * | 9/2003 | Hutzli et al. ................ | 370/468 |
| 2002/0097675 A1 | * | 7/2002 | Fowler et al. .............. | 370/230 |

FOREIGN PATENT DOCUMENTS

| | | | |
|---|---|---|---|
| EP | 748141 A2 | * | 12/1996 |
| EP | 788288 A2 | * | 8/1997 |
| JP | 11341037 | | 12/1999 |

OTHER PUBLICATIONS

Nho, J.M. et al., "Congestion Control with a New Fairness Criterion for Multicast ABR Service in ATM Networks," IEEE Communications, Jun. 1999. vol. 146, iss. 3, pp. 181-184.*
Tanthawichian, P. et al. "Bandwidth Allocation in ATM Networks: Heuristic Approach," 7th International Converence on Computer Communications and Networks, Oct. 12-15, 1998. pp. 20-25.*
B. Maglaris, et al "A Priority TDMA Protocol for Satellite Data Communications", International Conference on Communications, vol. 4 of 4, pp. 73.3.1-73.3.5.

* cited by examiner

*Primary Examiner*—Ricky Q. Ngo
*Assistant Examiner*—Donald L Mills
(74) *Attorney, Agent, or Firm*—Mattingly, Stanger, Malur & Brundidge, P.C.

(57) ABSTRACT

An ATM communication apparatus and the bandwidth control method thereof that are capable of bandwidth control to guarantee the minimum cell rate and limit the upper-limit for each of subscriber terminals, dynamically and fairly distribute the shared bandwidth based on the registered status and can be easily applied to the system that is already operating the actual service.

16 Claims, 8 Drawing Sheets

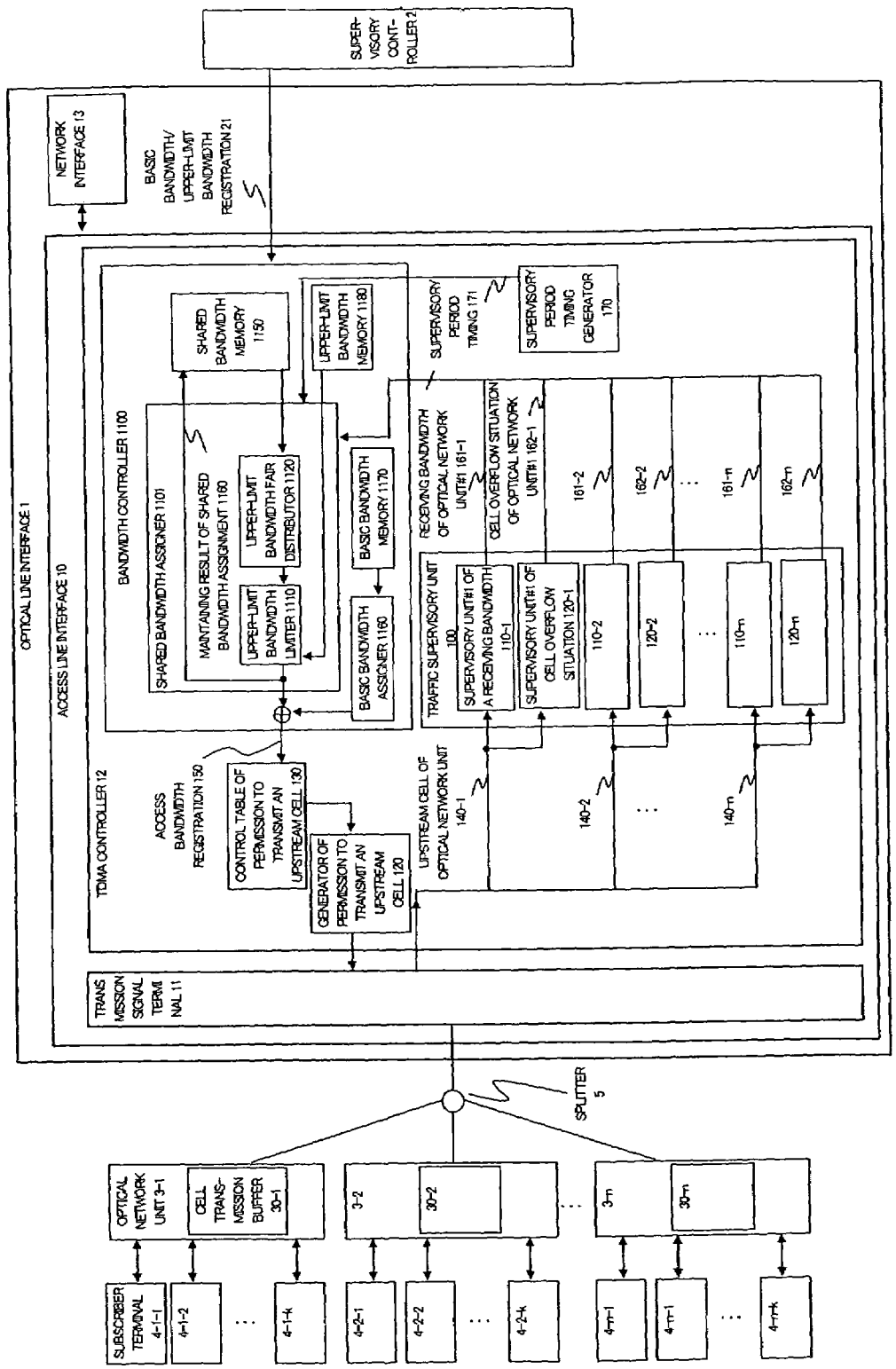
F I G. 1

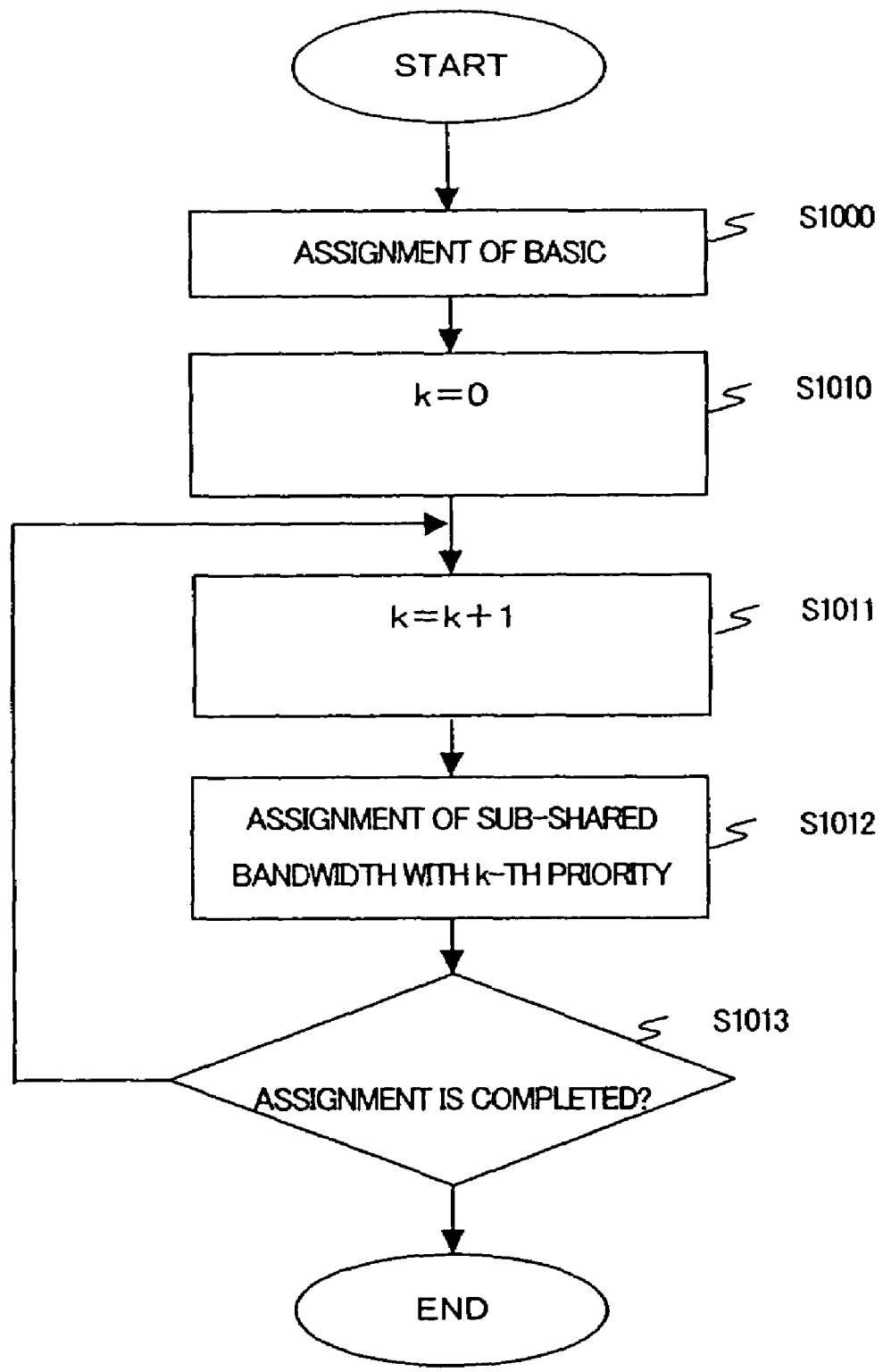
F I G. 9

ATM COMMUNICATION APPARATUS AND BANDWIDTH CONTROL METHOD OF THE SAME

BACKGROUND OF THE INVENTION

The present invention relates to an ATM communication apparatus and a bandwidth control method thereof. More particularly, the present invention relates to an ATM communication apparatus and a bandwidths control method thereof that, in a point/multi-point transmission system, can communicate effectively by dynamically altering bandwidth assignment among optical network units according to upstream traffic situation in an optical line interface in the case where burst signals sent by subscriber terminals connected to the optical network units respectively have originated in a Time Division Multiple Access (TDMA) control technique in which a plurality of the optical network units sends ATM cells according to permission to transmit an upstream cell issued by the optical line interface, the ATM communication apparatus and the bandwidth control method thereof are preferable for application to the point/multi-point transmission system in which the optical line interface provides the subscriber terminals with a plurality of quality of service such as a constant bit rate service, a best effort service or the like. Note that the present invention is not limited to the TDMA technique but can be also applied to the other appropriate multiplex techniques.

As a prior art of the TDMA control method that performs bandwidth assignment, for example, a technology is known that is described in Japanese Patent Laid-Open No. Hei 11(1999)-341037 gazette or the like. This technology is the point/multi-point transmission system in which the optical line interface and a plurality of the opposing optical network units are connected via a splitter and each of the optical network units transmits cells respectively with the time division multiple access control of the optical line interface.

This dynamical bandwidth sharing technique is characterized as described below.
(1) In each of the optical network units, the stored cell quantity of the sending cell buffers and the transmission permit signals of each of the optical network units are transmitted respectively.
(2) The optical line interface periodically supervises the stored quantity of the sending cell buffers and the transmission permit signals of each of the optical network units respectively.
(3) The optical line interface distributes unused transmission domains within transmission frames in accordance with the stored quantity of the sending cell buffers based on the stored quantity of the sending cell buffers and the transmission permit signals notified by each of the optical network units respectively in addition to transmission capacity assigned to the optical network units that require more transmission capacity.

In earlier technology, the above-described dynamical bandwidth sharing control technique allows the service classes with a high burst such as a personal computer communication or the like to use transmission capacity effectively.

SUMMARY OF THE INVENTION

In the foregoing TDMA control technique (the bandwidth control technique) according to the earlier technology, the following problems to be solved are further cited.

(1) With regard to a distribution theory 1: the necessity of a minimum cell rate In the earlier technology, a distribution ratio is decided only by cell buffer situation of the optical network units. This, for example, leads to biasedly assigning many bandwidths to the optical network units that demand extremely many transmission requests and is thus the technology in which the bandwidth is not guaranteed depending upon usage situation of other optical network units. When an actual service operation is taken into consideration, each of the optical network units does not always provide only the best effort services such as a personal computer data communication or the like. In the case where a plurality of the subscriber terminals are connected to the optical network units and, for example, a plurality of the classified quality services are provided simultaneously such as a constant bit rate services e.g. a leased line or the like, the relatively high-priority best effort service that transmits voice/image in real time and with high quality and the relatively low-priority best effort service e.g. a personal computer data communication or the like, the minimum cell rate for a constant bit rate service needs to be guaranteed to each of the optical network units respectively. Additionally, in the best effort services, there exists what is called a minimum-cell-rate-guaranteed type of the best effort service in which the minimum cell rate needs to be guaranteed. The minimum cell rate for it needs to be guaranteed as well.

(2) With regard to a distribution theory 2: the necessity of a peak cell rate and a fair distribution theory Furthermore, since in the technique of the earlier technology, a distribution ratio is decided only by cell buffer situation, thus it is the technique that does not take any contract of the optical network units into consideration. In the case where the best effort service is offered, it is necessary to decide the charges at the time when the contracts are made with users. However, in the case of the technology that can freely use the usable free domain bandwidths like the prior art, it becomes difficult to curb a tariff inexpensively, which is contrary to bandwidth efficiency, because differentiation is impossible among the users. Accordingly, the ATM communication apparatus and the bandwidth control method thereof are required that can register the usable peak cell rate that can be used at its maximum as a traffic parameter and furthermore comprises a fair distribution theory by weighting in consideration of the contracted quantity with the users.

(3) With regard to a shared bandwidth:

The shared bandwidth distributed in the earlier technology becomes an entire transmission domain within the transmission frame at its maximum. In the case of offering the best effort services with different qualities to every optical network unit, even if there is a quality difference among the best effort services, it is impossible to differentially distribute each of qualities. Accordingly, the ATM communication apparatus and the bandwidth control method thereof are required that comprises the distribution theory of the shared bandwidth that allows bandwidth sharing to be performed among the specific optical network units.

(4) Convenience in introducing the technology:

In the foregoing earlier technology, it is preconditioned that each of the optical network units comprises a function of transmitting the cell stored quantity of the sending cell buffers and the transmission permit signals of the optical network units respectively. In the case of applying of this prior art to the system that is operating the actual service already, not only the optical line interface that exists in the station office but also the optical network units, which are more numerous than the optical line interface because they are n-multipoint and besides possibly installed in the users' houses and in buildings, need to be updated. Therefore, the ATM communication apparatus and the bandwidth control method thereof are required that can materialize the bandwidth sharing only by updating the optical line interface.

The object of the present invention, in order to solve the foregoing problems, is to provide the ATM communication apparatus and the bandwidth control method thereof that comprise the distribution theory of guaranteeing the minimum cell rate for each of the subscriber terminals respectively, allowing the bandwidth control that limits an upper-limit bandwidth, dynamically and fairly distributing the shared bandwidth based on the register status, and performing the bandwidth sharing among the specific optical network units, and that can be easily applied to the system that is operating the actual service already.

In accordance with a first solving means, the present invention provides an ATM communication apparatus comprising:

a traffic supervisory unit for supervising traffic situation of upstream ATM cells sent from a plurality of the optical network units, the traffic supervisory unit having a supervisory unit of a receiving bandwidth for detecting the receiving bandwidth of ATM cells transmitted by optical network units and a supervisory unit of cell overflow situation for detecting a sending buffer in the optical network units;

a bandwidth controller having a basic bandwidth assigner for assigning the basic bandwidth, a shared bandwidth assigner for assigning a shared bandwidth based on an upper-limit bandwidth and a receiving bandwidth and cell overflow situation that were supplied from the traffic supervisory unit and the shared bandwidth memory for maintaining the assigned shared bandwidth; and a generator of permission to transmit an upstream cell for generating permission to transmit an upstream cell to the optical network units according to the shared bandwidth assigned by the bandwidth controller.

Furthermore, in accordance with a second solving means, the present invention provides a bandwidth control method that issues permission to transmit an upstream cell to a plurality of optical network units, comprising:

supervising traffic situation of an upstream ATM cells sent from a plurality of the optical network units;

detecting receiving bandwidth status and overflow situation of the ATM cells, which were transmitted from a plurality of the optical network units;

judging an access bandwidth of each of the optical network units according to the receiving bandwidth status and the cell overflow situation, which were detected, and a basic bandwidth and an upper-limited bandwidth;

guaranteeing the basic bandwidth determined for each of the optical network units;

distributing the shared bandwidth in the range of the upper-limit bandwidth where bandwidth distribution is judged to be necessary for the optical network units that are in the overflow situation or for the optical network units to which a shared bandwidth is set beyond the basic bandwidth based on the detected receiving bandwidth and the cell overflow situation.

The present invention provides the TDMA control technique (the ATM communication apparatus and the bandwidth control method thereof) that consists of: an optical line interface that issues instruction for permission to transmit an upstream cell to a plurality of optical network units according to upstream transmission bandwidths set by each of the optical network units respectively that the supervisory controller determined; a plurality of the optical network units that send the ATM cells according to the permission to transmit an upstream cell issued by the optical line interface; a plurality of the subscriber terminals connected to a plurality of the optical network units respectively; and a supervisory controller that registers each of the transmission bandwidths of a plurality of the optical network units for the optical line interface, the optical line interface and a plurality of the opposing optical network units being connected via a splitter, the optical line interface comprising: an access line interface unit that receives the ATM cells sent from a plurality of the optical network units and multiplexed in the splitter; and a network interface unit that transmits the received ATM cells to the network, the access line interface unit comprising: a transmission signal terminal that receives the ATM cells sent from a plurality of the optical network units; and a TDMA controller that issues the permission to transmit an upstream cell according to the transmission bandwidth to each of the optical network units that were set in the supervisory controller, the TDMA controller being applied to the point/multipoint transmission system, which is constituted of: a traffic supervisory unit for supervising traffic situation of the upstream ATM cells sent from a plurality of the optical network units; a bandwidth controller for judging the access bandwidth of each of the optical network units respectively based on the receiving bandwidth status and the cell overflow situation of the effective ATM cells transmitted by a plurality of the optical network unit that the traffic supervisory unit detected and furthermore according to the basic bandwidth and the upper-limit bandwidth set by the supervisory controller; a control table for permission to transmit an upstream cell for maintaining the access bandwidth judged by the bandwidth controller; a generator of permission to transmit an upstream cell for generating permission to transmit an upstream cell according to the access bandwidth judged by the bandwidth controller; and a supervisory periodical timing generator for generating a timing at which judgment processing on the bandwidth is made in the bandwidth controller according to the predetermined supervisory period, the traffic supervisory unit consisting of: a supervisory unit of a receiving bandwidth for detecting the receiving bandwidth of the effective ATM cells transmitted by the optical network units; and a supervisory unit of cell overflow situation for detecting cell overflow situation of the sending buffer in the optical network units, the bandwidth controller comprising: a basic bandwidth assigner for assigning the basic bandwidth set from the supervisory controller; a basic bandwidth memory for maintaining the basic bandwidth set from the supervisory controller; an upper-limit bandwidth memory for maintaining the upper-limit bandwidth set from the supervisory controller; a shared bandwidth assigner for assigning the shared bandwidth based on the upper-limit bandwidth set from the supervisory controller and the receiving bandwidth and the cell overflow situation sent by the traffic supervisory unit; and a shared bandwidth memory for maintaining the assigned shared bandwidth.

In addition, in the present invention, the shared bandwidth assigner comprises: a bandwidth fair distributor for assigning the shared bandwidth based on the receiving bandwidth and the cell overflow situation sent by the traffic supervisory unit; and an upper-limit bandwidth limiter for limiting the upper-limit bandwidth based on the upper-limit bandwidth set from the supervisory controller.

Furthermore, the present invention comprises a plurality of sub-shared bandwidth memories divided further in the shared bandwidth memory, and the shared bandwidth assigner comprises a shared bandwidth selector for selecting any one of a plurality of the sub-shared bandwidths memories for each of the optical network units respectively.

In addition, as means for a detecting cell overflow situation in the supervisory unit of cell overflow situation, the present invention can comprise means for detecting cell overflow that compares the receiving bandwidths of the effective cells received from each of the optical network units respectively and judges that the cell is in the overflow situation in the case where the access bandwidth judged by the band controller and the cell receiving bandwidths of each of the optical network units are the same or approximate. Alternatively, as means for detecting cell overflow situation in the supervisory unit of cell overflow situation, the present invention can comprise means for detecting invalid cells received from each of the optical network units respectively and means for detecting cell overflow to judge that the cell is in the overflow situation in the case where the invalid cell was not detected.

Furthermore, the present invention provides the ATM communication apparatus and the bandwidth control method thereof consisting of: an optical line interface that issues instruction of permission to transmit an upstream cell to a plurality of optical network units according to upstream transmission bandwidths set by each of the optical network units respectively that the supervisory controller determined; a plurality of the optical network units that feed ATM cells according to permission to transmit an upstream cell issued by the optical line interface; a plurality of the subscriber terminals connected to a plurality of the optical network units respectively; and a supervisory controller that registers each of the transmission bandwidths of a plurality of the optical network units for the optical line interface, the optical line interface and a plurality of the opposing optical network units being connected via the splitter, the optical line interface comprising: an access line interface that receives the ATM cells sent from a plurality of the optical network units and multiplexed in the splitter; and a network interface that transmits the received ATM cells to the network, the access line interface receiving the ATM cells sent from a plurality of the optical network units and performing TDMA control to issue the permission to transmit an upstream cell to each of the optical network units set in the supervisory controller according to the transmission bandwidth, the TDMA control technique being applied to the point/multi-point transmission system, and comprising the bandwidth management means, wherein traffic situation of the upstream ATM cells sent from a plurality of the optical network units is supervised, the receiving bandwidth status and the cell overflow situation of the effective ATM cells transmitted by a plurality of optical network units are detected, and the access bandwidth of each of the optical network units is judged respectively according to the receiving bandwidth status and the cell overflow situation of the effective ATM cells and furthermore the basic bandwidth and the upper-limit bandwidth set by the supervisory unit, the TDMA controlling technique, which makes judgment on the bandwidth in the bandwidth controller according to the predetermined supervisory period as its operation timing for managing the bandwidth, comprising the theory of: guaranteeing the basic bandwidth that has been determined for each of the optical network units set from the supervisory controller respectively as its bandwidth judgment theory, and distributing the shared bandwidth in the range of the upper-limit bandwidth set from the supervisory controller; judging the necessity of the bandwidth distribution for each of the optical network units respectively, weighting according to the upper-limit bandwidth set from the supervisory controller and performing distribution as the distribution theory of the shared bandwidth; and judging that the bandwidth distribution is necessary for the optical network unit that is in the cell overflow situation based on the receiving bandwidth and the cell overflow situation were sent by the traffic supervisory unit or for the optical network units to which the shared bandwidth is set beyond the basic bandwidth set from the supervisory unit as its judgment theory of the necessity of the bandwidth distribution on every optical network unit.

Since the receiving bandwidth and the cell overflow situation transmitted by each of the optical network units are supervised in the traffic supervisory unit, the present invention can be applied to a system only by updating the optical line interface that exists in the station office without updating the optical network units, in the case of applying the present invention to the system that is operating the actual service already. Moreover, the minimum cell rate of each of the optical network units can be guaranteed by assigning the access bandwidth to each of the optical network units according to the basic bandwidth set from the supervisory controller, and the access bandwidth of each of the optical network units cab be limited by limiting the access bandwidth to each of the optical network units according to the upper-limit bandwidth that has been set from the supervisory controller. In the bandwidth controller, the shared bandwidth can be dynamically assigned to each of the optical network units respectively by distributing the shared bandwidth based on the receiving bandwidth and the cell overflow situation of the ATM cells at every given period.

Furthermore, the shared bandwidth can be distributed fairly based on the register status by assigning the shared bandwidth according to the receiving bandwidth and the cell overflow situation of the ATM cells, the basic bandwidth and the upper-limit bandwidth that were set from the supervisory controller in the bandwidth fair distributor. The sub-shared bandwidth is corresponded to a Quality of Service (QoS) by dividing the shared bandwidth memory to select the sub-shared bandwidth for each of the optical network units, which enables the QoS to share the bandwidth among the same optical network units. Additionally, in the case where a plurality of the QoS are accommodated by one optical network unit, selection of a plurality of the sub-shared bandwidths for each of the optical network units allows the bandwidth to be shared among the optical network units that accommodate the QoS to which the relative sub-shared bandwidth corresponds.

BRIEF DESCRIPTION OF THE DRAWINGS

For a more complete understanding of the present invention and the advantages thereof, reference is new made to the following description taken in conjunction with the accompanying drawings.

FIG. 1 is a block diagram showing a system configuration in accordance with a first embodiment of the present invention.

FIG. 9 is a flowchart showing assignment of a bandwidth to a basic bandwidth and a sub-shared bandwidth in a bandwidth controller 1100.

DETAILED DESCRIPTION OF THE PREFERRED EMBODIMENTS

Hereinafter, the embodiments of the present invention will be described in detail with reference to the accompanying drawings. First, a related technology of the present invention will be explained.

Figure 8:
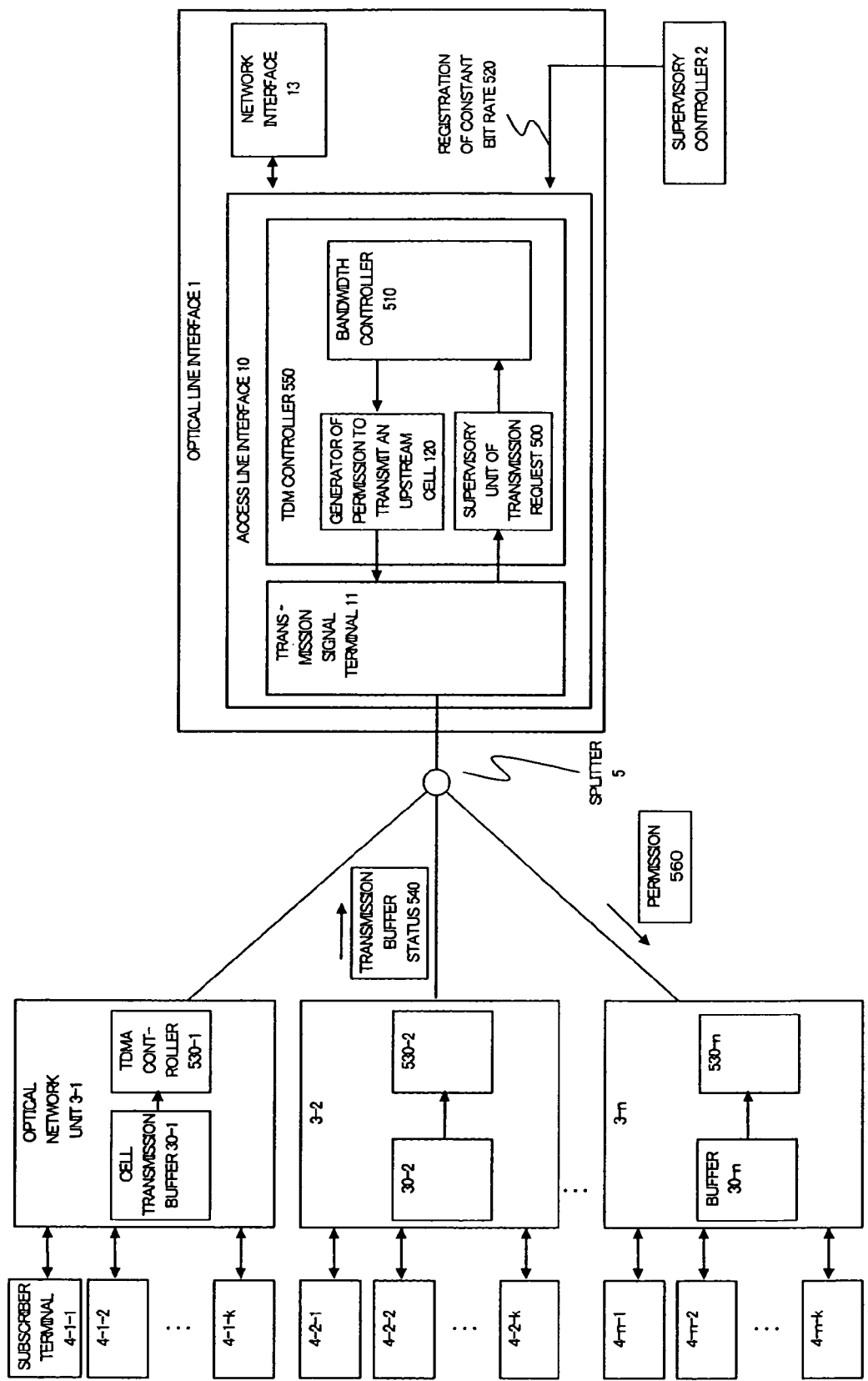
FIG. 8 is a block diagram showing a configuration of a point/multi-point transmission system.

FIG. 8 is a block diagram showing a configuration of the point/multi-point transmission system. Hereinafter, referring to this drawing, the TDMA bandwidth control method will be described. In the drawing, this system comprises an optical line interface 1, a supervisory controller 2, optical network units 3-1 to 3-n, subscriber terminals 4-1-1 to 4-n-k and a splitter 5. Furthermore, a constant bit rate register status 520 that the supervisory controller 2 registers for an access line interface 10, transmission buffer status 540 that the optical network units 3-1 to 3-n send to the optical line interface 1 and permission to transmit an upstream cell 560 are shown.

In the point/multi-point transmission system, the optical line interface 1 and a plurality of the opposing optical network units 3-1 to 3-n are connected via the splitter 5. The optical line interface 1 comprises the access line interface 10 and a network interface 13. The access line interface 10 comprises a transmission signal terminal 11 and a TDM controller 550. Furthermore, the TDM controller 550 includes a generator of permission to transmit an upstream cell 120, a supervisory unit of transmission request 500 and a bandwidth controller 510. The optical network units 3-1 to 3-n comprise cell transmission buffers 30-1 to 30-n and TDMA controllers 530-1 to n.

In the optical line interface 1, permission to transmit an upstream cell 560 is issued to each of the subscriber terminals in the generator of a permission to transmit an upstream cell 120 according to the constant bit rate register status 520 that the supervisory controller 2 registered for the access line interface 10. The optical network units 3-1 to 3-n send upstream signals according to the permission to transmit an upstream cell 560. Moreover, the optical network units 3-1 to 3-n notify the optical line interface 1 of the stored quantity of transmission buffers 30 as transmission buffer status 540. The supervisory unit of transmission request 500 periodically supervises transmission buffer status 540, sums up the transmission buffer status 540 sent from each of the optical network units 3-1 to 3-n, assigns the shared bandwidth and notifies the generator of the permission to transmit an upstream cell 120 of an assignment result.

Next, FIG. 1 is a block diagram showing a system configuration in accordance with a first embodiment of the present invention.

This system comprises an optical line interface 1, a supervisory controller 2, optical network units 3-1 to 3-n, subscriber terminals 4-1-1 to 4-n-k and a splitter 5. The optical line interface 1 comprises an access line interface 10, a network interface 13, a transmission signal terminal 11 and a TDMA controller 12. The TDMA controller 12 further comprises a generator of permission to transmit an upstream cell 120, a control table of permission to transmit an upstream cell 130, a supervisory period-timing generator 170, a basic bandwidth assigner 1160, a basic bandwidth memory 1170, a shared bandwidth memory 1150 and an upper-limit bandwidth memory 1180. Additionally, what are shown are: register status 21 of a basic bandwidth/an upper-limit bandwidth that the supervisory controller 2 registers for the access line interface 10; upstream cells 140-1 to n sent from each of the optical network units; receiving bandwidths of upstream cells 161-1 to n sent from each of the optical network units that a traffic supervisory unit; cell overflow situation 162-1 to n of each of the optical network units that the traffic supervisory unit sent; and a supervisory period timing 171 that the supervisory period timing generator generated. A traffic supervisory unit 100 includes supervisory units of receiving bandwidths 110-1 to n for supervising receiving bandwidths of upstream cells sent from each of the optical network units and supervisory units of cell overflow situation 120-1 to nfor supervising cell overflow situation of each of the optical network units. Moreover, a bandwidth controller 1100 includes an upper-limit bandwidth limiter 1110 and a fair distributor of a bandwidth 1120. The optical network units 3-1 to 3-n include cell transmission buffers 30-1 to n.

In this embodiment, the traffic supervisory unit 100 supervises traffic situation of upstream ATM cells 140-1 to n sent from a plurality of the optical network units. The bandwidth controller 1100 judges the access bandwidth of each of the optical network units based on receiving bandwidth status 161-1 to n and cell overflow situation 162-1 to nof the effective ATM cells transmitted by a plurality of the optical network units, which were detected by the traffic supervisory unit 100, and moreover according to the basic bandwidth/the upper-limit bandwidth 21 set by the supervisory controller 2. The control table 130 of permission to transmit an upstream cell maintains the access bandwidth judged by the bandwidth controller 1100. The generator 120 of permission to transmit an upstream cell generates permission to transmit an upstream cell according to the access bandwidth judged by the bandwidth controller 1100. A supervisory period-timing generator 170 generates a supervisory period timing 171 according to the predetermined supervisory period timing at which judgment processing on the bandwidth is performed in the bandwidth controller 1100. The traffic supervisory unit 100 comprises: a supervisory units of a receiving bandwidth 110 for detecting a receiving bandwidth 161 of the effective ATM cells 140 transmitted by the optical network units 3; and a supervisory unit of cell overflow situation 120 for detecting cell overflow situation 162 of sending buffers 30 in the optical network units 3.

The bandwidth controller 1100 comprises: a basic bandwidth assigner 1160 for assigning the basic bandwidth set from the supervisory controller 2; a basic bandwidth memory 1170 for maintaining the basic bandwidth set from the supervisory controller 2; an upper-limit bandwidth memory 1180 for maintaining the upper-limit bandwidth set from the supervisory controller 2;

a shared bandwidth assigner 1101 for assigning the shared bandwidth based on the upper-limit bandwidth set from the supervisory controller 2 and the receiving bandwidth 161 and the cell overflow situation that were sent by the traffic supervisory unit 100; and a shared bandwidth memory 1150 for maintaining the shared bandwidth assigned. Additionally, the shared bandwidth assigner 1101 comprises: a bandwidth fair distributor 1120 for assigning the shared bandwidth based on the receiving bandwidth and the cell overflow situation sent by the traffic supervisory unit 100 has fed; and an upper-limit bandwidth limiter 1110 for limiting the upper-limit bandwidth based on the upper-limit bandwidth set from the supervisory controller.

The traffic supervisory unit 100 detects the receiving bandwidths 161-1 to n and the cell overflow situation 162-1 to n from the upstream cells sent from each of the optical network units 3-1 to n respectively to send them to the bandwidth controller 1100. The shared bandwidth assigner 1101 of the bandwidth controller 1100 detects the receiving bandwidth 161 and the cell overflow situation 162 at the time when the supervisory period timing generator 170 generates the supervisory period timing 171 to judge the shared bandwidth assigned to each of the optical network units 3-1 to n. The shared bandwidth judged in the shared bandwidth assigner 1101 of the bandwidth controller 1100 is added to the basic bandwidth sent by the basic bandwidth assigner 1160 and is registered as the access bandwidth 150 in the control table of permission to transmit an upstream cell 130. The generator 120 of permission to transmit an upstream cell issues the permission to transmit an upstream cell to the optical network units 3 according to the access bandwidth of each of the optical network units 3 registered in the control table 130 of permission to transmit an upstream cell.

Figures 2, 3:
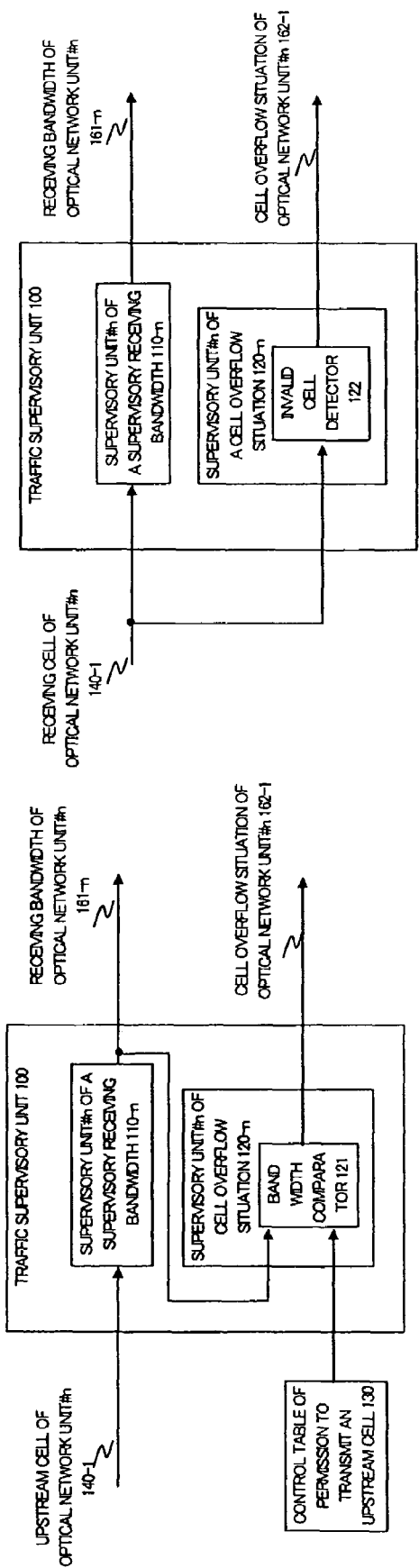
FIG. 2 is a block diagram showing a first embodiment of means for supervising cell overflow at supervisory units of cell overflow situation 120-1 to n.
FIG. 3 is a block diagram showing a second embodiment of means for supervising cell overflow at a supervisory unit of cell overflow situation 120.

In FIG. 2, the first embodiment of the means for supervising cell overflow at the supervisory units of cell overflow situation 120-1 to n is illustrated. Herein, the supervisory unit of cell overflow situation 120-n shows a bandwidth-comparison type of cell overflow detection technique that compares the receiving bandwidth with the permission to transmit an upstream cell, which was set, to judge the overflow situation. A bandwidth comparator 121 compares the access bandwidth to the optical network unit n, which was already set for the control table of permission to transmit an upstream cell 130, with the receiving bandwidth of the effective cell 161-n input from the supervisory unit of a supervisory receiving bandwidth 110-n to judge the overflow situation in the case where both are the same or approximate. Note that the bandwidth comparator 121 may perform the other appropriate comparison processing to judge the overflow situation.

In addition, in FIG. 3, the second embodiment of the means for supervising cell overflow in the supervisory unit of cell overflow situation 120 is illustrated. Herein, the supervisory unit of cell overflow 120-n shows an invalid cell detection type of detection technique cell overflow that judges the overflow situation by detecting the invalid cell. An invalid cell detector 122 judges the overflow situation in the case where the invalid cell is not detected in a receiving cell 140.

Figure 4:
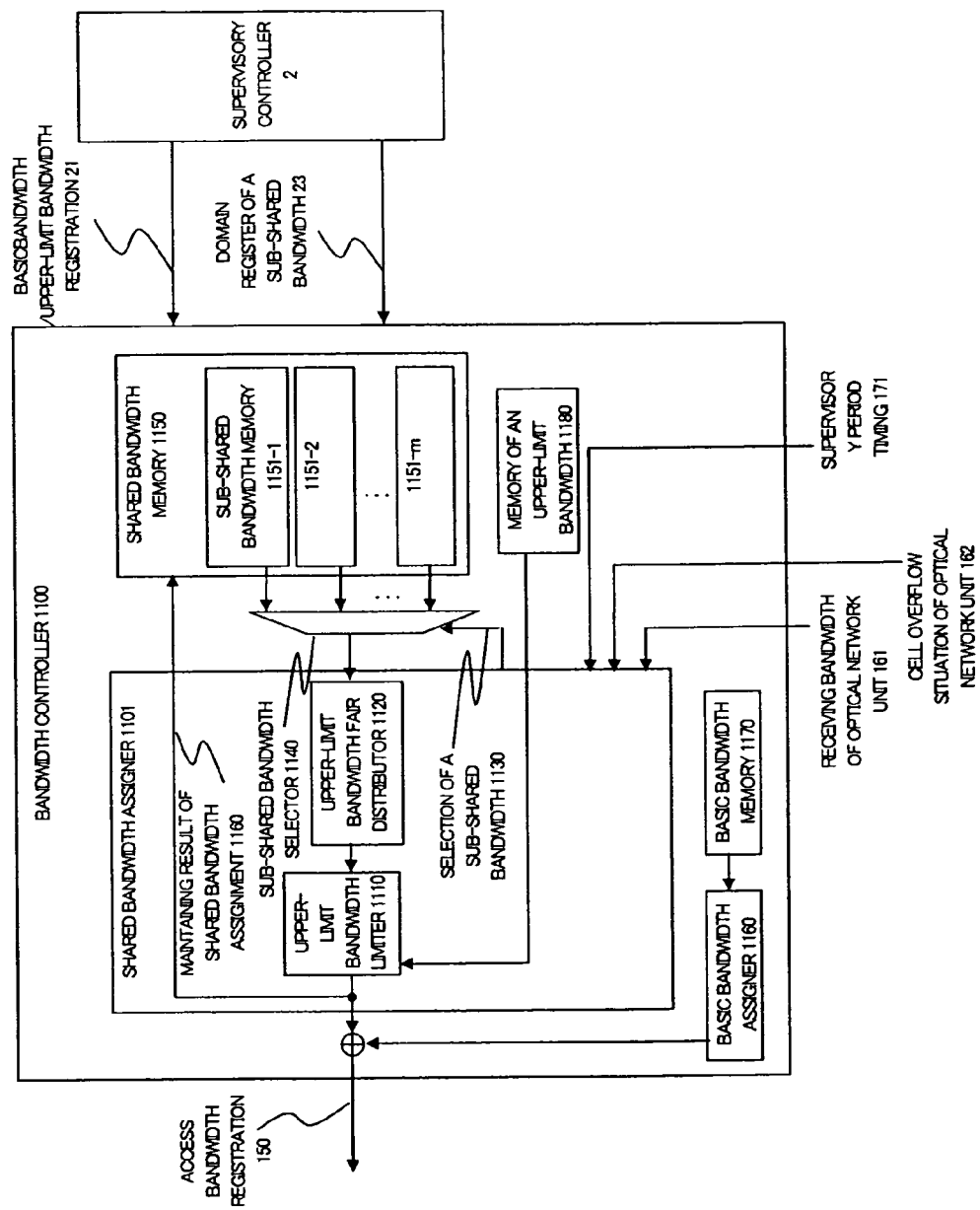
FIG. 4 is a block diagram showing a multi-divided type of bandwidth assignment technique comprising a shared bandwidth memory divided into multi-shared bandwidths.

Next, the second embodiment of the bandwidth controller 1100 is described. FIG. 4 is a block diagram showing a multi-divided type of bandwidth assignment technique comprising the shared bandwidth memory divided into multi-shared bandwidths. A shared-bandwidth memory 1150 is constituted of a plurality of sub-shared-bandwidths memories 1151-1 to m, furthermore a sub-shared bandwidth selector 1140 is provided. In the drawing, sub-shared bandwidth a selection signal 1130 is shown as a domain register signal of a sub-shared bandwidth 23. The shared bandwidth assigner 1101 selects any one of a plurality of the sub-shared bandwidth memories 1151-1 to m with the sub-shared bandwidth selection signal 1130. A bandwidth fair distributor 1120 assigns the sub-shared bandwidth that is to be assigned to the correspondent optical network units 3 from the sub-shared bandwidths memories 1151-1 to m selected by the sub-shared bandwidth selection signal 1130. The supervisory controller 2 registers designation of domain assignment for each of the sub-shared bandwidths respectively and the optical network units belonging to each of the sub-shared bandwidths respectively. In the shared bandwidth assigner 1101, the bandwidth fair distributor 1120 assigns the shared bandwidth to each of the optical network units 3-1 to n to limit the upper-limit bandwidth.

Figure 5:
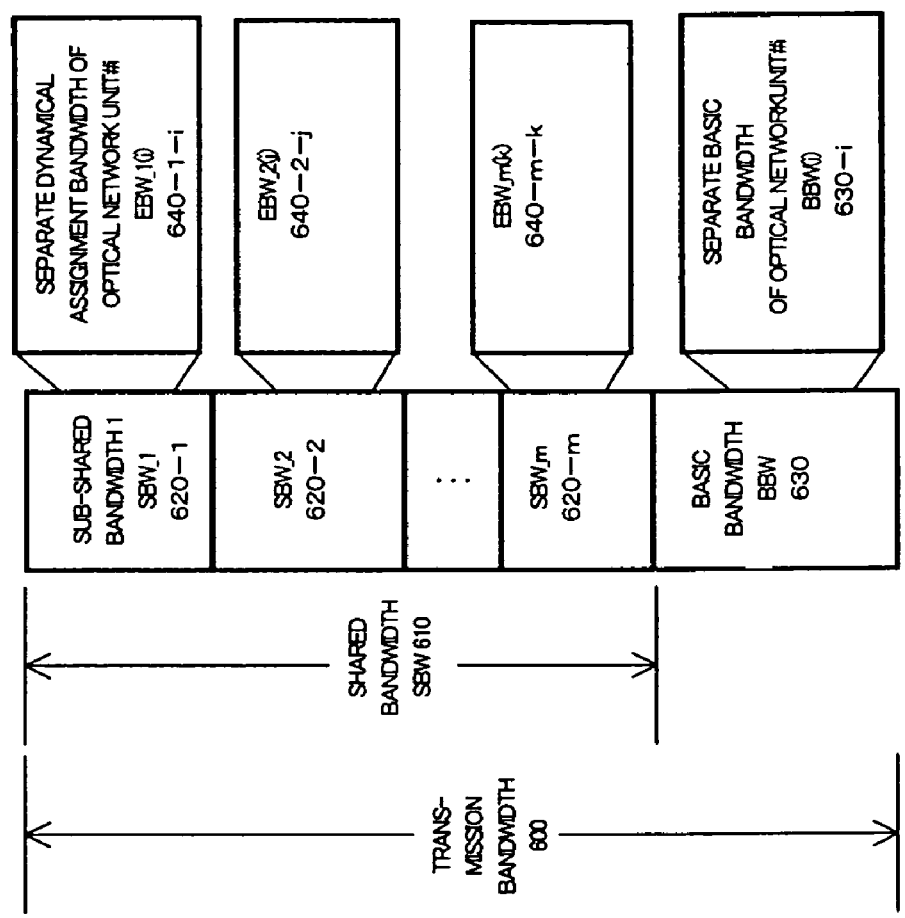
FIG. 5 schematically illustrates the concept on transmission bandwidth segments that are segmented in distributing the access bandwidths to each of the optical network units in accordance with the present invention.

Hereinafter, the bandwidth assignment technique of the bandwidth controller 1100 including this shared bandwidth assigner 1101 and the basic bandwidth assigner 1160 is described in detail. FIG. 5 schematically illustrates the concept on transmission bandwidth segments segmented in distributing the access bandwidths to each of the optical network units in the present invention. A bandwidth division technique in accordance with the present invention classifies a transmission bandwidth 600 into a basic bandwidth 630 (hereinafter, referred to as BBW) and a shared bandwidth 610 (hereinafter, referred to as SBW). The BBW 630 is the sum total of the basic bandwidths 630-i (hereinafter, referred to as BBW (i)) of the whole optical network units ranging from 3-1 to 3-n on each of the optical network units 3-i registered by the supervisory controller 2. On the other hand, the shared bandwidth 610 is the domain other than the basic bandwidth BBW 630 in the transmission bandwidth 600. The shared bandwidth SWB 610 is divided into a plurality of the sub-shared bandwidth domains 620-1 to m (hereinafter, referred to as SBW_1 to m), and each of the sub-shared bandwidth domains SBW_1 to m 620-1 to m include the shared bandwidth 640-m-i (hereinafter, referred to as EBW_m (i)) that was assigned to each of the optical network units belonging hereto.

Additionally, the dynamical assignment bandwidths of each of the optical network units can be assigned to a plurality of the sub-shared bandwidths respectively. For example, in the case where the optical network unit i is assigned to two kinds of the sub-shared bandwidths, SBW_p and SBW_q, the separate dynamical assignment bandwidths of the optical network unit i become EBW_p (i) and EBW_q (i) respectively. EBW_p (i) shares the bandwidth with the other separate dynamical assignment bandwidths in SBW_p. On the other hand, EBW_q (i) shares the bandwidth with the other separate dynamical assignment bandwidths in SBW_q. This allows the bandwidth to be shared among the same QoSs, in the case where a plurality of the QoSs (p and q in this example) are accommodated in the optical network unit i.

Figure 6:
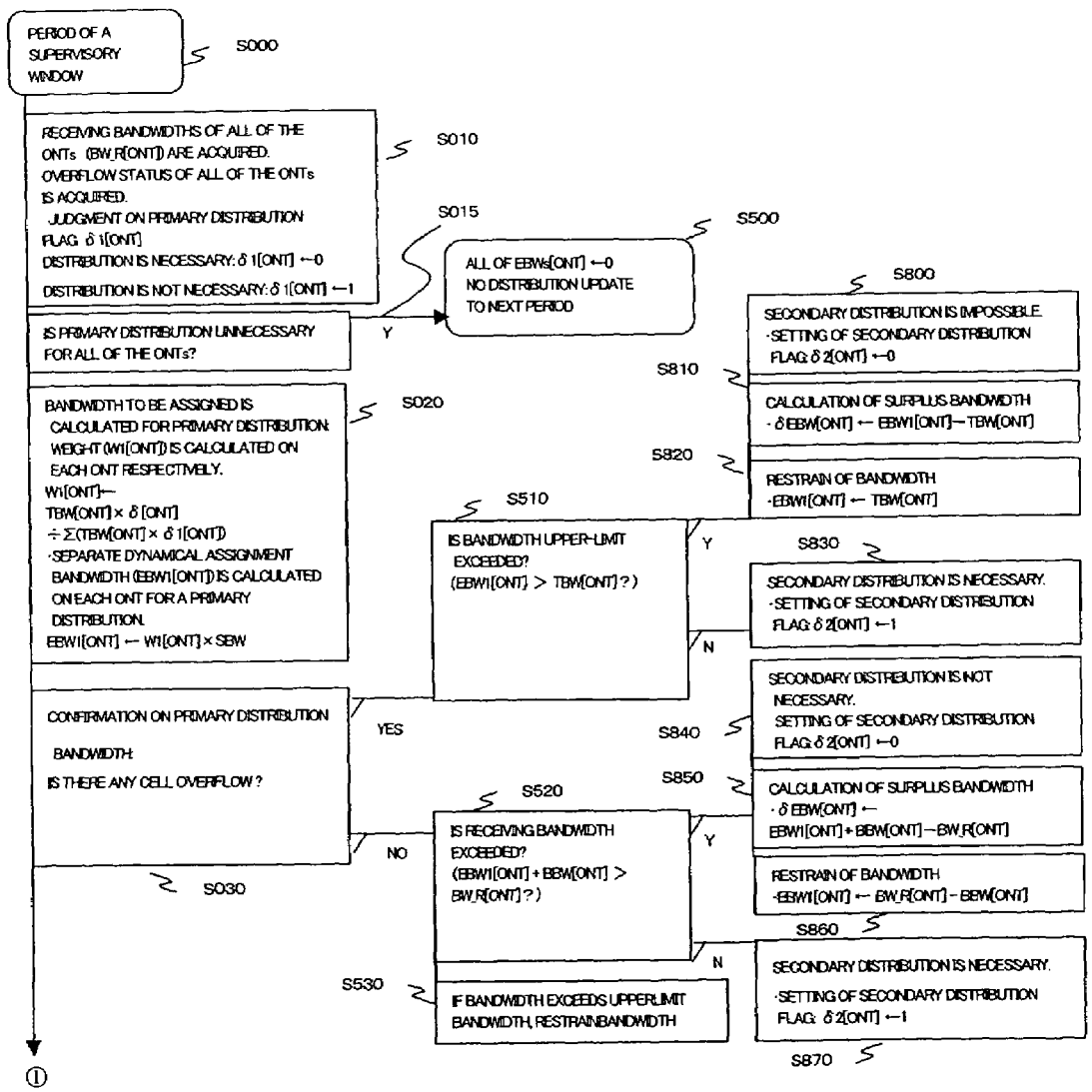
FIG. 6 is a flowchart (1) showing a bandwidth assignment control of a bandwidth controller 1100.
Figure 7:
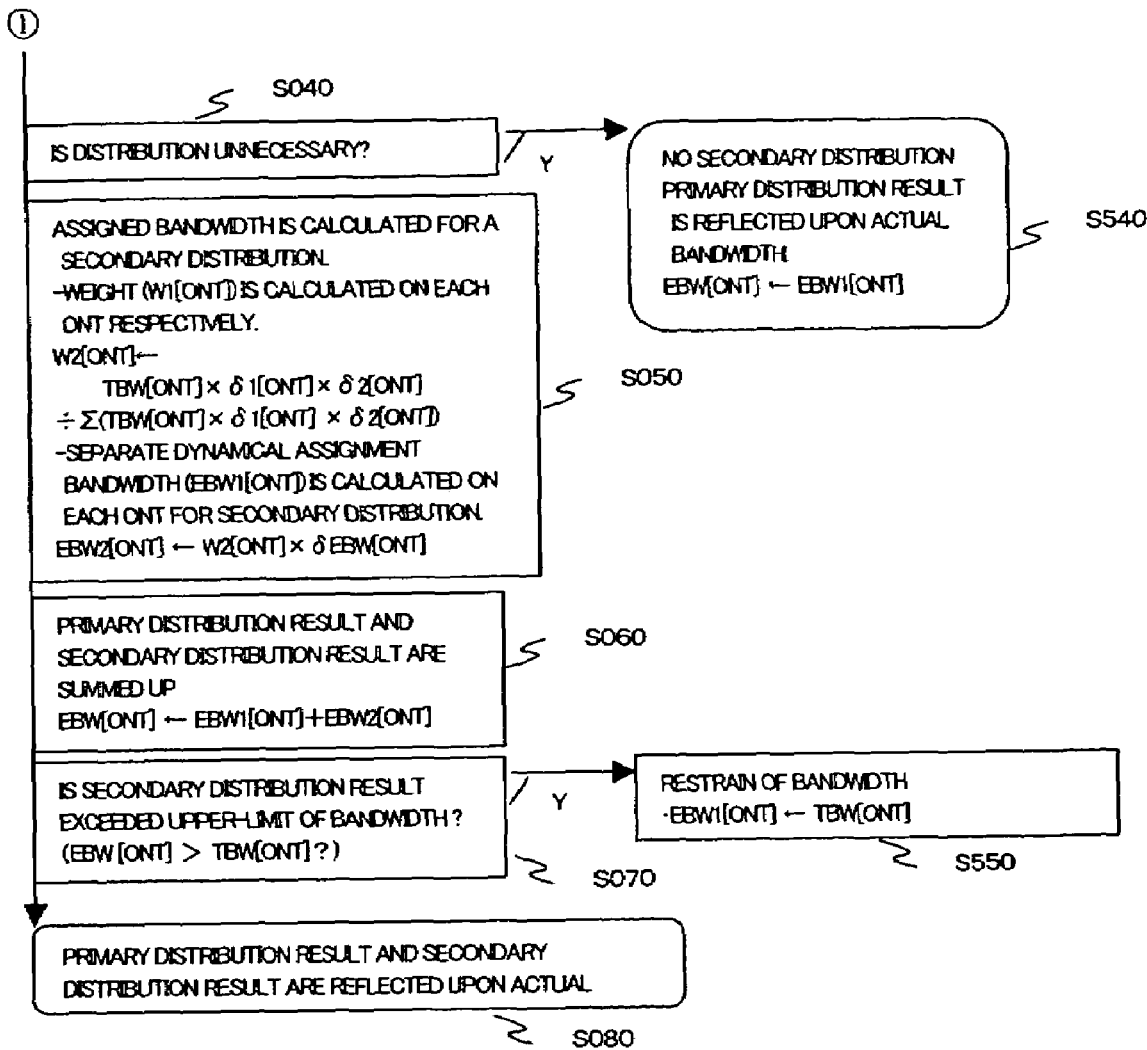
FIG. 7 is a flowchart (2) showing a bandwidth assignment control of the bandwidth controller 1100.

FIG. 6 and FIG. 7 illustrate the flowcharts of the bandwidth assignment control of the bandwidth controller 1100. The bandwidth assignment technique in accordance with this embodiment is performed in two stages, which are called a primary distribution and a secondly distribution respectively. Although the flow shown in the drawings represents a division theory in the sub-shared bandwidth SBW_m, description is made in the name of SWB in the drawing and hereinafter. Reference symbols in the flow are described. The optical network unit 3 is described in the name of ONT (Optical Network Terminal) in the flow, and hereinafter the optical network unit 3 is called ONT. BW_R [ONT] is the receiving bandwidth received from the correspondent ONT, and δ 1[ONT] is an identifying flag which sets a value of 1 for the ONT that requires the primary distribution and a value of 0 for the ONT that does not require the primary distribution. W1[ONT] represents a distribution weight on each ONT in the primary distribution. TBW[ONT] is the upper-limit bandwidth on each ONT set by the supervisory controller 2. Herein, the upper-limit bandwidth is the uppermost bandwidth that can be assigned from the shared bandwidths SBW, and the relation between TBW [ONT] and the maximum bandwidth PCR[ONT], which can be used by the correspondent ONT under the contract, is defined as follows. Note that the maximum bandwidth PCR[ONT] under the contract may coincide or correspond with the transmission bandwidth.

$$TBW[ONT]=PCR[ONT]-BBW[ONT]$$

The EBW1[ONT] is the assigned shared bandwidth of the correspondent ONT resulting from the primary distribution. δ 2[ONT] is the identifying flag which sets a value of 1 for the ONT that requires the secondary distribution and a value of 0 for the ONT that does not require the secondary distribution. W2[ONT] represents a distribution weight on each ONT in the secondary distribution. ΔEBW is the bandwidth that becomes an assignment resource in performing the secondary distribution.

Hereinafter, an operation is described according to this flowchart. At first, it starts at the time of generating the supervisory period timing 171 (S000), and the receiving bandwidths (BW_R[ONT]) and the cell overflow status of all of the ONTs are acquired in the step S010. In the case where either cell overflow exists or the assigned shared bandwidth EBW[ONT] assigned to the correspondent ONT at the previous period is not 0, the primary distribution is judged to be necessary, thus setting δ 1[ONT]=1, and in the case other than this, the primary distribution is judged not to be necessary, thus setting δ 1[ONT]=0. In the case where the ONT that requires receiving of the primary distribution does not exist in the step S015, the assigned shared bandwidths EBW[ONT] regarding all of the ONTs are set with 0 in the step S500. In the case where the ONT that requires receiving of the primary distribution exists, the distribution weight W1 is calculated on each ONT respectively in the step S020. The distribution weight W1 is distributed in proportion to the upper-limit bandwidth TBW[ONT]. A calculating equation for the distribution weight W1, for example, is described as follows.

$$W1[ONT]=TBW[ONT]\times\delta1[ONT]/\Sigma(TBW[ONT]\times\delta1[ONT]) \quad (1)$$

Σ in the above-described equation 1 is the total sum on all of the ONTs. The shared bandwidth assignment to each ONT by the primary distribution according to the W1 is as follows.

$$EBW1[ONT]=W1[ONT]\times SBW \quad (2)$$

Here in the step S030, confirmation on the distribution bandwidth is made. Firstly, judgment is made according to the cell overflow situation, and the operation splits to the step S510 in the case where cell overflow exists and to the step S520 in the case where no cell overflow exists. In the step S510, judgment is made if the assigned shared bandwidth EBW1[ONT] resulting from the primary distribution exceeds the upper-limit bandwidth TBW [ONT]. In the case where EBW1[ONT] exceeds TBW [ONT], the secondary distribution is impossible, thus the secondary distribution flag δ 2[ONT] is set at 0, the surplus bandwidth distributed excessively is set at ΔEBW[ONT] that is the assignment resources in performing the secondary distribution, and the EBW1[ONT] is set at the upper-limit value TBW[ONT]. On the other hand, in the case where the EBW1[ONT] does not exceed the TBW[ONT], the secondary distribution is regarded to be necessary for the correspondent ONT in the step S830, and thus the secondary distribution flag δ 2[ONT] is set at 1.

On the other hand, in the step S520, the primary distribution result EBW1[ONT]+the basic bandwidth BBW [ONT] and the receiving bandwidth BW_R[ONT] are compared, and in the case where the primary distribution result EBW1[ONT]+the basic bandwidth BBW[ONT] exceeds the receiving bandwidth BW_R[ONT], the secondary distribution is regarded to be unnecessary, thus the secondary distribution flag δ 2[ONT] is set at 0, the surplus bandwidth distributed excessively is set at ΔEBW[ONT] that is the assignment resource in performing the secondary distribution, and EBW1[ONT] is set at the receiving bandwidth BW_R [ONT]–the basic bandwidth BBW[ONT]. On the other hand, in the case where the primary distribution result EBW1[ONT]+the basic bandwidth BBW[ONT] does not exceed the receiving bandwidth BW_R[ONT], the secondary distribution is regarded to be necessary for the correspondent ONT, and thus the secondary distribution flag δ 2[ONT] is set at 1.

On the basis of the secondary distribution flag δ 2[ONT] that was judged at the above-described steps, in the case where the ONT that receives the secondary distribution does not exist in the step S040, the shared bandwidth EBW [ONT] as the final result is set at the primary distribution result EBW1[ONT] in the step S540.

Next, in the case where the ONT that receives the secondary distribution exists, the distribution weight W2 is calculated on each ONT respectively in the step S050. The distribution weight W2 is distributed in proportion to the upper-limit bandwidth TBW[ONT]. A calculating equation for the distribution weight W2, for example, is described as follows.

$$W2[ONT]=TBW[ONT]\times\delta1[ONT]\times\delta2[ONT]/\Sigma(TBW[ONT]\times\delta1[ONT]\times\delta2[ONT]) \quad (3)$$

Σ in the above-described equation 3 is the total sum on all of the ONTs. The shared bandwidth assignment to each ONT by the secondary distribution according to the W2 is as follows.

$$EBW2[ONT]=W2[ONT]\times\Delta EBW \quad (4)$$

Here in the step S060 the primary and the secondary distribution results are aggregated to calculate the assigned shared bandwidth EBW[ONT] as the final result.

$$EBW[ONT]=EBW1[ONT]+EBW2[ONT] \quad (5)$$

Finally, in the step S070, confirmation of the upper-limit for the assigned shared bandwidth EBW[ONT] is performed with the upper-limit bandwidth TBW[ONT] to restrain the upper limit. The distributed shared bandwidth EBW[ONT] to the ONT calculated in the above-described steps is set as an output of the shared bandwidth assigner in the step S080.

The flowcharts shown in FIG. 6 and FIG. 7 illustrate the embodiment of bandwidth distribution in specific sub-shared bandwidths, and next, the operation will be described for assigning a plurality of the sub-shared bandwidths.

FIG. 9 is a flowchart illustrating assignment of the bandwidth to the basic bandwidth and the sub-shared bandwidth in the bandwidth controller 1100. The basic bandwidth is assigned preferentially in the step S1000. Next, the shared bandwidth is assigned, and from the step S1010 on assignment priorities are given among the sub-shared bandwidths so that the sub-shared bandwidths with a higher assignment priority are assigned preferentially and in order. Specifically, the sub-shared bandwidths are assigned in order (S1010 to S1012) according to a secondary priority (k=1, 2, 3 . . . ) and the processing finishes when the assignment is completed (S1013). In this case, for example, an appropriate memory section is provided to store a priority in advance, and thus the bandwidth controller 1100 may be constituted so as to refer to the priority in assigning.

The flowcharts shown in FIG. 6 and FIG. 7 illustrate the embodiment of distributing the distribution weight in proportion to the upper-limit bandwidth TBW[ONT]. As another embodiment of the distribution method, the bandwidth can be assigned in proportion to the basic bandwidth BBW[ONT] in addition to proportioning it to the upper-limit bandwidth TBW[ONT]. Additionally, it is possible to distribute evenly without giving any priority among a plurality of the ONTs.

Furthermore, as described above, although the technique of assigning the bandwidth always to BBW [ONT] was shown, assignment of the bandwidth can be related to the receiving bandwidth BW_R [ONT] in another embodiment of BBW[ONT] assignment. Specifically, in the step S010, in the case where the receiving bandwidth BW_R[ONT] at the basic bandwidth BBW[ONT] or less, not the BBW[ONT] but BW_R[ONT] is assigned, and the surplus bandwidth BBW[ONT]−BW_R[ONT] can be utilized as the shared bandwidth. Thus the bandwidth can be utilized effectively with the primary distribution [SBW'=SBW+BBW [ONT]− BW_R[ONT]].

The distribution method proportioned to the upper-limit bandwidth TBW[ONT] and the distribution method proportioned to the basic bandwidth BBW[ONT] were shown in the foregoing can be specified on each of the sub-shared bandwidths. Additionally, with regard to the basic bandwidth BBW[ONT], the method of always assigning the bandwidth in a fixed manner and the method of assigning by relating to the receiving bandwidth BW_R[ONT] were shown. On the other hand, in the present invention, a plurality of the classes of the basic bandwidths can be provided independently at the same time to allow the method for assigning the bandwidth to specify on each of the basic bandwidths respectively. In this case, assignment priorities are given among a plurality of the basic bandwidths to assign the basic bandwidth with a higher priority preferentially. In the case where the basic bandwidths need to be referred to in each of the sub-shared bandwidths, a specific bandwidth is referred to out of a plurality of the basic bandwidths. In this case, for example, an appropriate memory section is provided to store a priority in advance, and thus the bandwidth controller 1100 may be constituted so as to refer to the priority in assigning.

The flowcharts shown in FIG. 6, FIG. 7 and FIG. 9 showed an example applied to the system in which the bandwidths are assigned to each of the optical network units ONT, which can be applied to the system in which a plurality of the subscriber contracts exist in one optical network unit and a unit of assigning the bandwidth is not assigned to each of the optical network units ONT but is also independently assigned to each of the subscriber contracts. In that case, it is applied to the system in which the permission to transmit an upstream cell is not issued to the optical network unit ONT by the unit, but issued to the subscriber contract by the unit, and application is possible without any modification to the foregoing flowchart. In this case, a memory section storing appropriate data necessary for assignment of such as an attribute, an identifier and a priority of each of the subscriber contracts is provided in advance for one optical network unit ONT, and thus the bandwidth controller 1100 may be constituted so as to refer to the data in assigning.

In accordance with the present invention as described above, it is possible to provide the ATM communication apparatus and the bandwidth control method thereof that allows the bandwidth control to guarantee minimum cell rate and to limit the upper-limit, dynamically and fairly distributes the shared bandwidths based on the register status and can be easily applied for the system that is already operating the actual service by comprising means for: supervising the receiving bandwidth and the cell overflow status on each of the optical network units respectively; guaranteeing the basic bandwidth registered by the supervisory controller; distributing the shared bandwidth at a ratio according to the upper-limit bandwidth registered by the supervisory controller; and restraining with the upper-limit bandwidth.

Although the preferred embodiments of the present invention have been described in detail, it should be understood that various changes, substitutions and alternations can be made therein without departing from spirit and scope of the inventions as defined by the appended claims.

What is claimed is:

1. An Asynchronous Transfer Mode (ATM) communication apparatus in a point-to-multipoint optical transfer system where the ATM communication apparatus is connected to a plurality of optical network units through an optical branching device, and the ATM communication apparatus, receives a multiplexed signal obtained when the optical branching device multiplexes optical signals transmitted by the optical network units, and branches an optical signal at the optical branching device to transmit to the optical network units, the ATM communication apparatus sends to each of the optical network units by using a certain area in an ATM cell, transmission timing and a transmission bandwidth of an ATM cell to be transmitted to the ATM communication apparatus to give an access right to control a communication bandwidth to perform ATM-cell receiving control in the optical transfer system, the ATM communication apparatus comprising:

a traffic supervisory unit for supervising a traffic situation of ATM cells sent to said ATM communication apparatus from the optical network units, the traffic supervisory unit having a supervisory unit of a receiving bandwidth for detecting the receiving bandwidth for receiving ATM cells from each of the optical network units and a supervisory unit of cell overflow situation for detecting a cell overflow situation of a sending buffer of ATM cells in each of the optical network units;

a bandwidth controller having a basic bandwidth assigner for assigning a basic bandwidth for sending ATM cells to each of the optical network units, an upper-limit bandwidth storage means for storing an upper-limit bandwidth set as upper-limit of bandwidth which is usable for transmission of ATM cells of each of said optical network units, a shared bandwidth assigner for assigning a shared bandwidth which is usable with the basic bandwidth to each of the optical network units according to value of the upper-limit bandwidth based on a receiving bandwidth and cell overflow situation that were supplied from said traffic supervisory unit, and the shared bandwidth storage means for storing the shared bandwidth assigned to each of the optical network units by said shared bandwidth; and a generator of access permission for generating access permission to assign optical network units according to the shared bandwidth assigned by said shared bandwidth assigned, wherein said supervisory unit of said cells overflow situation comprises an invalid cell detector that detects invalid cells received from each of said optical network units based on predetermined conditions and judges that the detected invalid cell is in the cell overflow situation in a case where the invalid cell was not detected by the optical network units.

2. The ATM communication apparatus according to claim 1, wherein said shared bandwidth assigner of said bandwidth controller comprises:

a bandwidth fair distributor for assigning the shared bandwidth based on the receiving bandwidth and the cell overflow situation sent by said traffic supervisory unit; and an upper-limit bandwidth limiter for limiting the upper-limit bandwidth based on the upper-limit bandwidth stored in the upper-limit bandwidth storage means.

3. The ATM communication apparatus according to claim 1, wherein said shared bandwidth storage means comprises a plurality of divided sub-shared bandwidth storage means and said shared bandwidth assigner further comprises a shared bandwidth selector for selecting any one out of a plurality of said sub-shared bandwidth storage means for each of said optical network units.

4. The ATM communication apparatus according to claim 1, further comprising an access bandwidth storage means for storing an access bandwidth which is made by adding the basic bandwidth and the shared bandwidth for each of said optical network units, wherein said supervisory unit of cell overflow situation comprises a bandwidth comparator that compares the receiving bandwidth and the access bandwidth for each of said optical network units and judges the cell overflow situation.

5. The ATM communication apparatus according to claim 1, wherein said bandwidth controller assigns a plurality of the separate assignment bandwidths for one optical network unit to a plurality of the sub-shared bandwidths respectively.

6. The ATM communication apparatus according to claim 1, wherein said bandwidth controller assigns the shared bandwidth based on a predetermined priority for each of the sub-shared bandwidths.

7. The ATM communication apparatus according to claim 1, wherein said bandwidth controller provides a plurality of kinds of the basic bandwidths and assigns the shared bandwidth in proportion to each of the basic bandwidths.

8. The ATM communication apparatus according to claim 1, wherein said bandwidth controller assigns one of the basic bandwidth and the shared bandwidth based on the contents of a plurality of subscriber contracts set for one optical network unit.

9. A bandwidth control method for controlling a bandwidth of Asynchronous Transfer Mode (ATM) cells received from each of a plurality of optical network units, in a point-to-multipoint optical transfer system where an ATM communication apparatus is connected to the optical network units through an optical branching device, and the ATM communication apparatus receives a multiplexed signal obtained when the optical branching device, multiplexes optical signals transmitted by the plurality of optical network units and branches an optical signal at the optical branching device to transmit to the optical network units, the ATM communication apparatus sends to each of the optical network units by using a certain area in an ATM cell, transmission timing and a transmission bandwidth of an ATM cell to be transmitted to the ATM communication apparatus to give an access right to control a communication bandwidth to perform ATM-cell receiving control in the point-to-multipoint optical transfer system, the bandwidth control method comprising:

dividing a transmission bandwidth, which said plurality of optical network units use for transmission of ATM cells, to a basic bandwidth and a shared bandwidth;

dividing the basic bandwidth and assigning it to said optical network units;

setting a upper-limit bandwidth which represents an usable maximum bandwidth to each of said optical network units;

supervising traffic situation of ATM cells received from any one of the optical network units, and detecting receiving bandwidth status which represents a bandwidth used by said any one of the optical network units;

comparing the detected receiving bandwidth status and a bandwidth which is set as an usable area to said any of optical network unit and judging whether a wider bandwidth than the bandwidth which is set to said any one of the optical network units is need or not;

where it is judged that the wider bandwidth than the bandwidth which is set to said any one of the optical network units is needed, assigning a shared bandwidth, with an amount according to the upper-limit bandwidth set to said any one of the optical network units within the shared bandwidth, to said any one of the optical network units;

where sum of the basic bandwidth of said any one of the optical network units and the assigned shared bandwidth does not exceed the upper-limit bandwidth, setting the sum as a bandwidth usable by said any one of the optical network units, and, where the sum exceed the upper-limit bandwidth, setting the upper-limit bandwidth as a bandwidth usable by said any one of the optical network units; and issuing access permission to said any one of the optical network units according to the bandwidth set to be usable by said any one of the optical network units, wherein an invalid cell as determined based on predefined conditions received from any of the optical network units is detected to judge that the detected invalid cell is in the overflow situation in a case where the invalid cell was not detected by the optical network unit.

10. The bandwidth control method according to claim 9, wherein the shared bandwidth to be distributed is further divided into sub-shared bandwidths in distributing said shared bandwidth such that selection is made as to from which sub-shared bandwidth the distribution is performed on every optical network unit out of a plurality of the divided sub-shared bandwidths.

11. The bandwidth control method according to claim 9, wherein, for assigning the shared bandwidth to said any one of the optical network units, the shared bandwidth is assigned to said any one of the optical network units with the rate of the upper-limit bandwidth of said any one of the optical network units to sum of the upper-limit bandwidth of said plurality of optical network units.

12. The bandwidth control method according to claim 9, wherein the receiving bandwidths of the effective cells, which were received from each of the optical network units, are compared to judge that the cell is in the overflow situation in the case where the judged access bandwidth and the receiving cell bandwidth of each of the optical network units are the same or approximate.

13. The bandwidth control method according to claim 9, wherein a plurality of the separate assignment bandwidths for one optical network unit are assigned to a plurality of the sub-shared bandwidths respectively.

14. The bandwidth control method according to claim 9, wherein the shared bandwidth is assigned based on a predetermined priority for each of the sub-shared bandwidths respectively.

15. The bandwidth control method according to claim 9, wherein a plurality of kinds of the basic bandwidths are provided to assign the shared bandwidth in proportion in each of the basic bandwidths respectively.

16. The bandwidth control method according to claim 9, wherein one of the basic bandwidth and the shared bandwidth is assigned based on the contents of a plurality of subscriber contracts set for one optical network unit.

* * * * *